United States Patent

Depoitier et al.

[11] 4,121,456
[45] Oct. 24, 1978

[54] METER FOR THE FLOW RATE OR THE SPEED OF A GAS STREAM

[75] Inventors: Jacques Depoitier, Wanfercee-Baulet; Ovidio Monaco, Nivelles; Michel Destabelle, Fleurus, all of Belgium

[73] Assignee: Institut National des Radio-Elements - Nationaal Instituut voor Radio-Elementen, en abrege: I.R.E., Brussels, Belgium

[21] Appl. No.: 837,976

[22] Filed: Sep. 29, 1977

[30] Foreign Application Priority Data

Oct. 5, 1976 [BE] Belgium .................................. 846943

[51] Int. Cl.² ............................................... G01F 1/56
[52] U.S. Cl. ................................................... 73/194 F
[58] Field of Search ....................... 73/194 F; 324/33; 250/356

[56] References Cited

U.S. PATENT DOCUMENTS

| | | | |
|---|---|---|---|
| 2,611,268 | 9/1952 | Mellen | 73/194 |
| 2,861,452 | 11/1958 | Morgan | 73/194 |
| 3,706,938 | 12/1972 | Petriw | 73/194 |
| 3,835,705 | 9/1974 | Hadjidjanian | 73/194 |
| 3,996,795 | 12/1976 | Servassier | 73/194 |

*Primary Examiner*—Herbert Goldstein
*Attorney, Agent, or Firm*—Sughrue, Rothwell, Mion, Zinn and Macpeak

[57] ABSTRACT

There is described a meter for the flow rate or the speed of a gas stream, by converting an electric potential metering, which comprises a pair of so-called outer tubular electrodes connected to an electric voltage source and through which the gas stream will pass, said electrode pair forming with a common electrode two series-connected electric fields, as well as an ion source which is located inside the one electrode while the common electrode is connected to a measuring circuit responsive to the potential of said electrode, in which both outer electrodes are arranged on either side and with a spacing relative to the common electrode which is also a tube-like shape.

8 Claims, 1 Drawing Figure

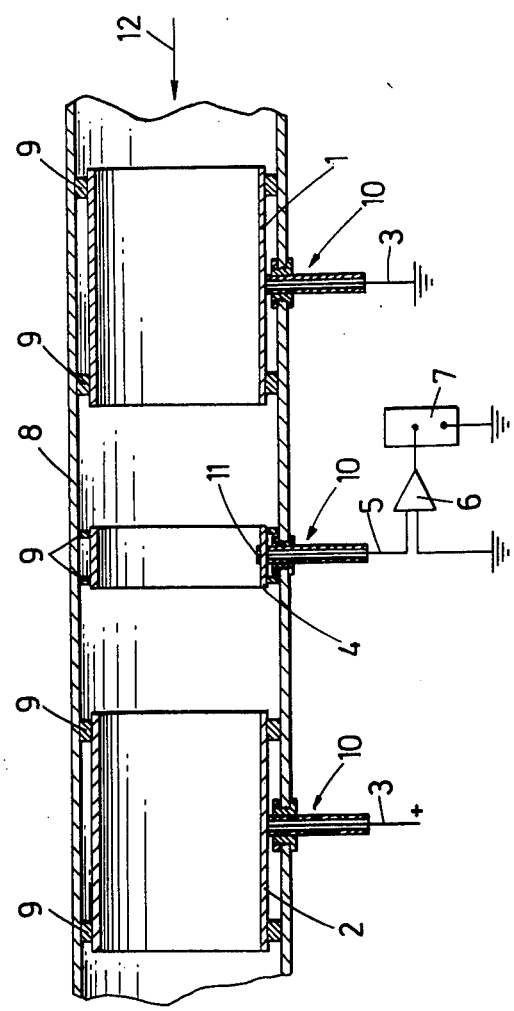

METER FOR THE FLOW RATE OR THE SPEED OF A GAS STREAM

This invention relates to a meter for the flow rate or the speed of a gas stream, by converting an electric potential metering, which comprises a pair of so-called outer tubular electrodes connected to an electric voltage source and through which the gas stream will pass, said electrode pair forming with a common electrode two series-connected electric fields, as well as an ion source which is located inside the one electrode while the common electrode is connected to a measuring circuit responsive to the potential of said electrode.

A meter of this kind has been described in Belgian Pat. No. 797,751 filed in the name of the applicant. In said known meter, the common electrode is comprised of a rod which extends axially through both outer electrodes which lie in co-axial relationship with a spacing relative to one another.

Said known embodiment has notably for drawback that a stray electrostatic field is formed between the outer electrodes.

A more recent embodiment proposed by the applicant in Belgian Pat. No. 841,944, proposes a different geometry for the electrodes which allows avoiding said drawback; this embodiment further allows by using a low-voltage source in combination with an electronic measuring circuit, substantially reducing the meter size and making same suitable for measuring low gas flow rates in the range of millimeters per second. According to the geometry of said embodiment, the outer electrodes lie in concentric relationship, the one electrode being longer than the other one.

This invention has for object to provide a meter of the kind described which allows measuring with high accuracy low gas flow rates, by insuring a flow without disturbances of the gas stream. The meter according to the invention has notably for purpose to allow providing a sensitivity of 1 volt per 5 l/h between 1 and 10 l/h. Instead of the flow rate or in addition thereto, the meter can show the speed of the gas stream. Both data are obtained by extrapolating from the potential value at the common electrode.

This invention has also for object to provide a meter of small size, easy to handle and making use of a low-voltage source which thus does away with any safety problem.

For this purpose according to the invention, both outer electrodes are arranged on either side and with a spacing relative to the common electrode which is also of tube-like shape.

In a preferred embodiment of the invention, the three electrodes lie in co-axial relationship and they have substantially the same diameter.

In another preferred embodiment of the invention, the ion source is located inside the common electrode.

Other details and features of the invention will stand out from the description given below by way of non limitative example and with reference to the accompanying drawing, the single FIGURE of which is a diagrammatic lengthwise cross-section through a meter for the flow rate of a gas stream according to the invention.

The apparatus according to the invention comprises two outer tube-like electrodes 1, 2 which are connected through lines 3 respectively to the ground and the positive pole of a low-voltage source, preferably with a voltage from 5 to 15 volts.

Between the outer electrodes 1, 2 is located the common electrode 4, which is also tube-like and connected through a line 5 to an electronic measuring circuit which comprises an operational amplifier 6 and a processing unit 7 for the amplified information.

The three electrodes 1, 4, 2 are thus of tube-like shape and in co-axial relationship.

They are arranged inside a sheath 8 which is made from an insulating material, inside which said electrodes are supported by fastening rings 9. The lines 3, 5 are passed through insulating liners 10.

The ion source which is for instance comprised of a capsule 11, is fastened inside the common electrode 4. Said source is preferably made from that material known as Americium which radiates $\alpha$ rays.

The above-described geometry generates two series-connected electric fields, the one field between electrodes 1, 4 and the other one between electrodes 4, 2 as well as two ionizing chambers, the one chamber inside electrode 1 and the other one inside electrode 2, for the ions generated by the particles radiated by source 11, from those gas atoms which are caused to flow lengthwise along the direction of arrow 12, inside the three electrodes.

The potential at the common electrode 4 is a direct function of the impedances (this term being meant in the large electronic meaning thereof, defining the resistance of a circuit to the current flow) of the chambers, which is in turn a function of the speed of the gas stream which moves more or less the ions inside that chamber formed by electrode 1 towards the chamber formed by electrode 2.

Tests have shown that when the meter is connected to a source with a voltage from 5 to 15 volts, the optimum dimensions lie in the following range:

length of electrodes 1, 2 = 4 cm
length of electrode 4 = 1 cm
diameter of electrodes 1, 2, 4 = 1.3 cm
wall thickness of electrodes 1, 2, 4 = 1 mm
spacing between electrodes 1, 4 and 4, 2 = 1.5 cm.

Under such conditions there is obtained a sensitivity of 1 volt per 5 l/h flow rate, between 1 and 10 l/h, when using a voltage level corresponding to a very low current strength, in the range of a few pA.

It must be understood that the invention is in no way limited to the above embodiments and that many changes can be brought therein without departing from the scope of the invention as defined by the appended claims.

We claim:

1. A meter for measuring the flow rate of a moving gas stream as a function of a sensed electrical potential, comprising:
    (a) an elongated gas flow conduit,
    (b) a pair of tubular electrodes mounted within the conduit and spaced apart from each other,
    (c) means connected to the pair of electrodes for establishing an electrical potential thereacross,
    (d) a tubular common electrode mounted within the conduit between the pair of electrodes to form two series-coupled electric fields therewith, the pair of and common electrodes being coaxially aligned,
    (e) a source of ionizing radiation mounted within the common electrode, and
    (f) means connected to the common electrode for sensing the electrical potential thereof.

2. A meter as defined in claim 1, wherein the conduit is made of an electrically insulating material.

3. Meter as defined in claim 1, in which the three electrodes have substantially the same diameter.

4. Meter as defined in claim 1, in which the length of the common electrode is approximately one-fourth of the length of the pair of electrodes.

5. Meter as defined in claim 4, in which the spacing between the common electrode and each one of the pair of electrodes is approximately equal to the diameter of said electrodes.

6. Meter as defined in claim 1, in which said meter is energized by a low-voltage source.

7. Meter as defined in claim 1, in which said ion source is a source of $\alpha$ rays.

8. Meter as defined in claim 1, in which the measuring circuit comprises an electronic circuit.

* * * * *